No. 667,298. Patented Feb. 5, 1901.
P. CUNNINGHAM.
SHAFT REVERSING DEVICE.
(Application filed Mar. 15, 1899.)
(No Model.)

Witnesses:
H. P. Guillo.
Fred A. Stanley.

Inventor:
Patrick Cunningham
By J. E. & Wm. Maynadier
Attorneys.

UNITED STATES PATENT OFFICE.

PATRICK CUNNINGHAM, OF NEW BEDFORD, MASSACHUSETTS, ASSIGNOR OF THREE-FOURTHS TO FRED D. STANLEY, OF SAME PLACE, AND WILLIAM A. WHITTLESEY, OF PITTSFIELD, MASSACHUSETTS.

SHAFT-REVERSING DEVICE.

SPECIFICATION forming part of Letters Patent No. 667,298, dated February 5, 1901.

Application filed March 15, 1899. Serial No. 709,221. (No model.)

*To all whom it may concern:*

Be it known that I, PATRICK CUNNINGHAM, of New Bedford, in the county of Bristol, in the State of Massachusetts, have invented a Shaft-Reversing Device, of which the following is a specification, reference being had to the accompanying drawings, in which—

Figure 1:
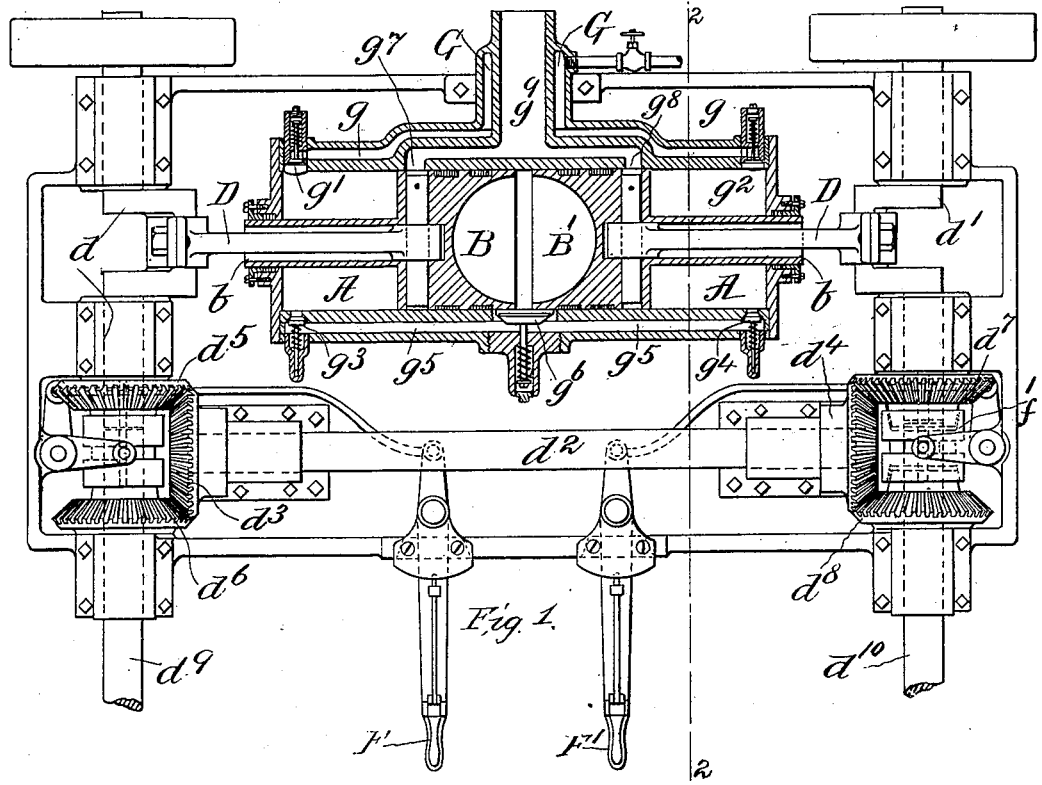
Figure 2:
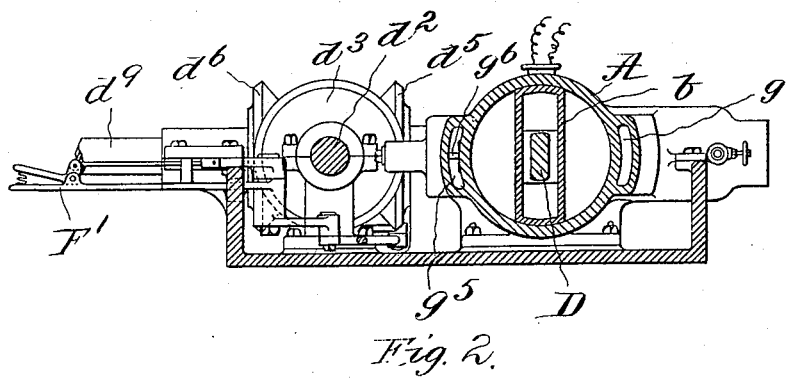

Figure 1 is a plan, partly in section, of a gas-engine with my device. Fig. 2 is a section on line 2 2 of Fig. 1.

The engine shown consists of a cylinder A, with two pistons B and B', each of which is cup-shaped at one end, the two cup-shaped ends abutting when the pistons are each at the inner end of its stroke, the cupped portion of the pistons forming an explosive-chamber, in which the explosive mixture is compressed.

The piston-rods $b$ are flattened tubes, within which the pitmen D oscillate. The crank-shafts $d$ $d'$ are connected to revolve in unison, the shaft $d^2$, carrying the bevel-gears $d^3$ $d^4$, being the preferred form of connection. The gears $d^3$ $d^4$ mesh with the gears $d^5$ $d^6$ and $d^7$ $d^8$. The gear $d^5$ is fast to crank-shaft $d$ and the gear $d^7$ fast to crank-shaft $d'$, while the gear $d^6$ is loose on driven shaft $d^9$ and the gear $d^8$ loose on driven shaft $d^{10}$. The crank-shafts $d$ $d'$ are shown as each revolving in a direction opposite to the other, but each always revolving in one direction when the engine is in operation. When the levers F F' are each in its intermediate position, as shown in Fig. 1, the driven shafts $d^9$ $d^{10}$ are disconnected from the crank-shafts $d$ $d'$; but when the handle ends of levers F F' are thrown toward each other the crank-shaft $d$ is connected directly to the driven shaft $d^9$ and the crank-shaft $d'$ directly to driven shaft $d^{10}$, and when the handle ends of the levers F F' are thrown apart the first effect is to disconnect both driven shafts from both crank-shafts, the extreme movement apart of the levers F F' connecting shaft $d$ with shaft $d^9$ reversely through gears $d^5$, $d^3$, and $d^6$, which are then clutched to driven shaft $d^9$, and also connecting shaft $d'$ with shaft $d^{10}$ through gears $d^7$, $d^4$, and $d^8$, which are then clutched to driven shaft $d^{10}$. This combination of the three bevels at one end of shaft $d^2$ with three bevels at the other end of that shaft—the two driving-shafts, the two driven shafts, and the double-acting clutches to connect each driving-shaft with its driven shaft directly and reversely—is my invention and of much practical importance, for when shaft $d$ is clutched to shaft $d^9$ by means of the movable member $f$ of the clutch splined on the shaft $d^9$ and shaft $d'$ is clutched to shaft $d^{10}$ by means of the movable member $f'$ of the clutch splined on shaft $d^{10}$ shaft $d^2$ and its gears $d^3$ $d^4$ serve to connect the two driving-shafts $d$ and $d'$, and gears $d^6$ and $d^8$ are idle; but when these gears $d^6$ $d^8$ are clutched to their shafts $d^9$ $d^{10}$ the power of shaft $d$ is transmitted through gears $d^5$, $d^3$, and $d^6$ to shaft $d^9$, for gear $d^6$ and shaft $d^9$ are then connected by clutch $f$, and the power of shaft $d'$ is transmitted through gears $d^7$, $d^4$, and $d^8$ and clutch $f'$ to shaft $d^{10}$. Moreover, when either clutch $f$ or $f'$ is in its intermediate position while the other is in working position the whole power of both driving-shafts is transmitted to only one of the driven shafts $d^9$ $d^{10}$, and also either shaft $d^9$ or $d^{10}$ can be reversed without reversing the other.

The explosive mixture flows into supply-port $g$ through supply-port G and enters the ends of the cylinder past valves $g'$ $g^2$ when the pistons make their instroke. When the pistons make their outstroke, the mixture is compressed and flows out through valves $g^3$ $g^4$ into port $g^5$ and from that port past valve $g^6$ into the cylinder and between the two pistons. When the pistons make their instroke, the mixture between them is compressed in the cups of the pistons, and as soon as the pistons have completed their instroke the mixture is exploded and the pistons are forced outwardly; but as they near the end of their outstrokes they open the exhaust-ports $g^7$ $g^8$ and the products of explosion escape through those ports into exhaust-pipe $g^9$, that portion of the gases due to the explosion which remains being forced out through the exhaust-ports by the inflow of the new charge; but all this—that is, the supply, the exhaust, and the explosion of the explosive mixture—is too well known to require further description.

What I claim as my invention is—

In combination the two crank-shafts; the two driven shafts; the connecting-shaft; the two bevel-gears, one at one end, the other at the other end of the connecting-shaft; a pair of bevel-gears in mesh with the bevel-gear at one end of the connecting-shaft; another pair of bevel-gears in mesh with the bevel-gear at the other end of the connecting-shaft; two double-acting clutch members, one for one set of gears and their shafts, the other for the other set of gears and their shafts; and means to operate each clutch member independently of the other; all substantially as described.

PATRICK CUNNINGHAM.

Witnesses:
WM. MAYNADIER,
HENRIETTA POWERS.